United States Patent

Behar et al.

[15] 3,662,521
[45] May 16, 1972

[54] DEVICE FOR REACTION BETWEEN LIQUID PHASE AND GASEOUS PHASE

[72] Inventors: Meyer Behar, Lyon; Jean-Pierre Dal Pont, Decines; Jerome Montet, Senlis, all of France

[73] Assignee: Progil, Paris, France

[22] Filed: Mar. 27, 1970

[21] Appl. No.: 23,238

[30] Foreign Application Priority Data

Mar. 27, 1969 France..................................6908385

[52] U.S. Cl...................................55/237, 55/256, 55/257, 55/455, 261/77, 261/79 A
[51] Int. Cl. .......................................................B01f 3/04
[58] Field of Search......................261/77, 79 A; 55/256, 257, 55/237, 455

[56] References Cited

UNITED STATES PATENTS

| | | | |
|---|---|---|---|
| 2,779,724 | 1/1957 | Dunning et al........................ | 261/79 A |
| 2,847,083 | 8/1958 | Hibshman............................. | 261/79 A |
| 3,412,529 | 11/1968 | Tailor ................................... | 261/79 A |
| 3,557,535 | 1/1971 | Howick.................................. | 55/237 |

FOREIGN PATENTS OR APPLICATIONS 83,536  4/1962  France....................................261/77

*Primary Examiner*—Tim R. Miles
*Attorney*—Browdy and Neimark

[57] ABSTRACT

A reactor for reaction between liquid phase and gaseous phase reactants which contains a coaxial chimney within the reactor which has a distributor located intermediate its length and has a quieting device attached to its lower end.

5 Claims, 4 Drawing Figures

PATENTED MAY 16 1972  3,662,521

INVENTOR
Meyer Behar
Jean-Pierre Dal Pont &
Jerome Montet

DEVICE FOR REACTION BETWEEN LIQUID PHASE AND GASEOUS PHASE

The present invention relates to a new type of reactor which is well adapted to continuous reactions between liquids and gases, and/or between liquids, gases and solids.

There are various types of apparatus which have been described which permit close contact between a liquid and a gas; the results they give vary according to the type of the reaction being achieved and according to the characteristics of the products present. An especially critical case is the reaction between a liquid and a gaseous phase, possibly in the presence of a more or less finely divided solid, either produced by reaction, or introduced into the medium, for example a catalyst.

Among those known devices, a first group are tanks which are stirred mechanically, as, for example, in French Pat. No. 1,379,783 dated Oct. 18, 1963, which describes a cylindrical reactor, with mechanical stirring and the blowing of a gas into the liquid phase by a turbine axis. Heating and/or cooling of the reactor is by means of a double jacket. This type of apparatus does not always yield a completely homogeneous and stable gas/liquid emulsion, nor satisfactory thermal exchanges. The double heating jacket may be the place of coalescence phenomena with acceleration of gaseous veins, and/or the place of reaction medium degradation by means of localized superheating.

According to other techniques stage columns have been recommended such as, for example, that described in French Pat. No. 1,450,577 dated June 9, 1965. This apparatus does not always permit obtaining either an absolutely satisfactory homogenization of gaseous and liquid phases, or the best thermal exchanges.

Bubble columns have also been described which include a vertical main body and a coaxial internal circulation tube, having a variable height, but generally at most equal to one half the height of the main body. The liquid phase, previously heated, then generally mixed or emulsified, is injected at the bottom of the main body, inside the circulation tube and in the reactor axis. The gaseous phase is blown by any convenient means into the bottom of the reactor. One of these devices has been described in the addition No. 83,536 to the French Pat. No. 1,277,669 dated Apr. 26, 1963. In this mode, the liquid phase is injected into two zones: the one into the axis and inside the circulation tube, and the other one into the axis and above the circulation tube. Apart from the fact that this type of reactor can neither ensure a very close mixture of liquid and gaseous phases, nor prevent possibly the formation of gaseous pockets and ascensional currents, generating vibrations, it is interesting to note that in the zone in which the reaction begins, liquid currents are induced, from bottom to top, inside the circulation tube, and from top to bottom between said tube and the main body, and that generally those non-directed currents may create turbulences prejudicial to the reaction development.

There has now been found and developed a new type of reactor which overcomes the precited disadvantages and gives excellent homogeneity of the gas/liquid emulsion a good equilibrium of gas/liquid and possibly solid phases in reaction, a surface speed of the gaseous phase which is much higher than in the already known devices and a very large liquid volume, measured with regard to the emulsion volume.

The new reactor according to the present invention comprises a cylindrical long jacket, which ends at its extremities in curved ends and the inside of which contains essentially:

a. a coaxial tube forming a chimney, the upper part of which extends approximately up to the head of the main cylindrical envelope and the lower part of which is separated from the reactor bottom by a free zone. The tube is connected at its lower end to a system which acts to center the liquid whirl, that is which maintains the liquid whirl along the vertical axis of the tube. This system includes an inverted hollow truncated cone perforated at the bottom and attached to plates disposed radially to act as baffles. A distributor is located in the tube.

b. means for introducing the liquid and gaseous fluids, comprising, for the liquid phase, perforated vertical tubes situated on every side of the chimney, and, for the gaseous phase, injection devices situated at the level of the foot of the chimney and on this circumference.

c. baffle elements disposed radially in the reactor top, for the emulsified flux.

d. means for drawing off and removing fluids situated in the lower and upper caps of the reactor.

The existence of a central chimney, within the reactor which is the object of the invention has great importance in continuous running. Contrary to the known apparatus in which the use of a coaxial tube is recommended, it has been found advantageous to use a tube the height of which is approximately equal to that of the reactor. Moreover, an important characteristic of the technology according to the invention consists of providing a fluid distributor in the chimney, which includes a plurality of conveniently orientated blades creating apertures which allow a regular flowing of the gas/liquid emulsion, inside this coaxial tube.

This distributor may be disposed at any chimney level. Its positioning depends upon the height of the gas/liquid emulsion within the reactor and upon the gas retention power of the liquid mass. The orientation of blades, disposed in a crown, is such that there is created in the central tube a motion of descending rotation, which gives rise, by centrifugation to a separation of gaseous and liquid phases. Thus, a liquid whirl forms in the chimney, in the center of which is established a gaseous hollow in funnel form the top of which is turned downwards, as best shown in FIG. 1 wherein the liquid phase is hatched and the gas phase is unhatched as shown at $f$.

According to a modified form of the invention, the upper half-part of chimney is provided coaxially with the chimney about the distributor with a double jacket playing the part of a funnel, the base of which is fixed to the chimney in a tight way. In such a case, it is desirable that the upper part of this chimney have a reduced diameter in order to create in the upper part of funnel a greater passing section.

As indicated hereinabove the chimney base has inside a whirl centering inverted truncated cone, the large base of which is directed upwardly and intended for collecting the descending liquid whirl. The vertical plates connecting this cone to the chimney base, delimit side draining zones for the degassed liquid. This association of the inverted cone and vertical plates allows the regularization of the rotating motion of the liquid column to center the descending whirl and finally to break the rotating motion in order to obtain at the plates outlet degassed liquid veins, giving rise to a regular flow. According to a variation, the precited cone may be situated above the level of the plates in the chimney axis, and at such a point that it is on a level with the gaseous whirl.

The interdependent elements of the chimney base including the inverted cone and plates is connected to a kind of basin, the bottom of which is perforated and provided with baffles, which plays the part of a quieting device which quiets the degassed liquid turbulence, prevents the descending migration of gas bubbles coming from the gaseous phase injection nozzles. Moreover this device plays the part of a deflector, permitting readmission of a large part of the degassed liquid phase within the emulsion, and ensuring a slow flowing of the residual liquid fraction through the perforations of the basin.

The device comprising the chimney and the quieting device allows a fluid circulation concurrently in the reaction zone, with simultaneous degassing of the emulsified fraction, as an efficient separation between the two liquid and gaseous phases.

The vertical tubes, intended for feeding the reactor with the liquid phase, are provided with a series of perforations which, preferably, face one another according to tube diameter. The number of those perforations, their diameter and the distance between them along the tube length may be variable. According to an especially advantageous arrangement, diameters may be increasing from the base up to the end of the feeding systems. Further, the number, diameter and height of feeding pipes are not critical factors and depend essentially upon reactor size and feeding rates.

Injection devices intended for the feeding of the gaseous phase into the reactor are situated above the level of the quieting device and at such a distance from it that the produced gaseous bubbles be not carried toward the reactor bottom.

Gas diffusers are provided with concentrical tubulures pierced in their lower part with several holes having identical or not identical diameters. According to a preferred form of the invention, especially interesting when there are fouling hazards of diffusers apertures, those tubulures are provided with aprons provided with two cylindrical surfaces of low height set at each side of the tubulures, so delimiting a volume open downwards. The edge of those aprons is cut according to various geometrical shapes such as for example: triangle, rectangle, square, half-circle, half-elipse. The gaseous phase fills the precited volume, equilibrates the degassed liquid phase and escapes in the form of fine and independent bubbles, by the effect of some overpressure. Several variants of diffusers may be advantageously used for the formation of fine bubbles, as for example fritted materials or any other substance having some porosity with regard to gas.

Baffles disposed in the upper part of reactor may be provided with inclined or vertical plates interdependent with the feeding tubes or with the reactor walls; those plates are immersed for a large portion in the liquid/gas emulsion and their main function is to allow degassing of the gas/liquid emulsion and to reduce the amplitude of waves produced by the departure of gas and/or vapor escaping from the reaction mixture.

Gaseous phase removing and degassed liquid phase drawing off are made by means of pipings situated respectively at reactor head and base according to known technology.

Utilizing the devices recited which constitute the novel reactor according to the invention, the regular diffusion of a gas and the feeding of a liquid phase, which is made continuously and at various levels, create the conditions which are the most favorable for obtaining a stirred reaction mixture free from violent gaseous currents generating vibrations, in order to reach an homogeneous gas/liquid emulsion having a stable level and without any superheating point. The turbulence is quieted and canalized by the anti-motion plates, which are located in the lower and upper zones of the apparatus. An efficient contact of gas and liquid is made in this way all along the length of the apparatus. Moreover, the separation of liquid and gaseous phase is made by centrifugation and the fraction of degassed liquid phase is recovered, in the form of a regular flow, at the reactor base.

The invention will be better understood by a detailed description of the apparatus in conjunction with the drawings wherein.

Figure 3:
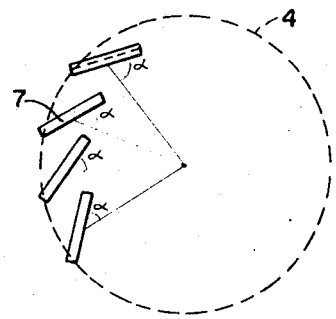
FIG. 3 is a plan view taken along the line III—III of FIG. 1.

The reactor comprises an outer cylindrical tank 1 provided at its ends with curved bottoms 2 and 3 serving respectively for gaseous phase removing and for liquid phase drawing off. Inside and on the axis of the reactor, is disposed a cylindrical jacket 4 forming a chimney, fixed to the internal walls of the reactor by rigid elements not shown in the figure. This chimney may have, in its upper part, a relatively large number of holes 5, distributed uniformly about the jacket surface, having such a diameter that the gaseous phase flows in a regular and continuous way. According to the invention there is disposed, in the zone approximately situated between the upper and lower quarter of the chimney 4, a distributor 6 provided with blades 7 disposed in crown form. The blades 7, best shown in FIG. 3, are attached at their upper and lower ends to the upper and lower portions of the cylindrical jacket 4. The blades are arranged at an angle $\alpha$ between the face of the blade and a line joining the center of the reactor and the center of gravity of the blade. Thus the liquid phase enters inside the distributor nearly tangentially to the chimney. The distributor collects the gas/liquid emulsion which arrives continuously from the space 8 defined by the reactor walls and the internal chimney. Thus there is established inside of the chimney, an emulsion rotation creating a centrifugal descending current as shown by the arrow $f$ which gives rise to a preparation of the gaseous and liquid phases.

Figure 4:
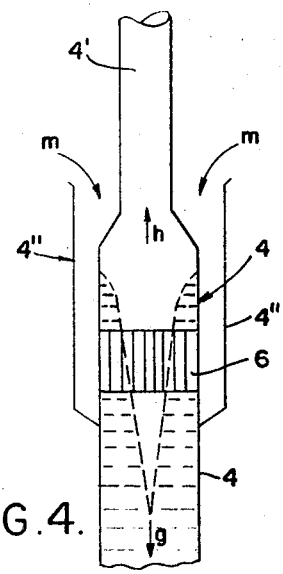
FIG. 4 is a partial diagrammatic view similar to FIG. 1 of a portion of the reactor of a modified form of the invention.

According to the embodiment of the invention shown in FIG. 4, distributor 6 is generally situated in the upper half of chimney 4. The upper portion of chimney 4 ends in a cylinder 4' having a reduced diameter and is provided coaxially with a double jacket 4'' the base of which recloses tightly on the chimney.

The lower part of the chimney 4 has a coaxial hollow truncated cone 9, the large base of which is oriented upwardly. Attached to the lower end of the chimney 4 are a plurality of radial vertical plates 10 which are also attached to the hollow cone 9. These plates 10 are also interlocked with the quieting device 11,12 resulting in a perforated geometrical surface 11, which as illustrated is in the form of an inverted pyramid, the large base of which has a width which is close to that of the diameter of the reactor. The surface is made rigid by means of vertical blades 12.

The feeding device for the liquid phase consists of vertical tubes 13 provided with perforations 14, as explained hereinabove, and fixed to the reactor by convenient means not illustrated.

The system of gaseous phase introduction into the reactor has been broadly described previously. It is illustrated in the drawing by the tubular crowns 15, disposed above the quieting device 11–12 and at a convenient distance from the latter.

Plates serving as baffles and disposed at the reactor top are represented by the elements 16. These elements may be fixed either on the tubes 13 as shown in the figure or on the reactor walls or according to any other means.

The circulating motion of fluids inside the reactor is made in a regular and continuous way. The liquid phase introduced at $a$ through the perforated tubes 13 is continuously fed into the reactor and so maintains a given volume. The gaseous phase which is blown into the lower part of the main jacket escapes at $b$ upwardly creating within the liquid an intimate contact of the two phases and gives rise to the formation of an emulsion, having an ascending motion. In the form of the invention according to FIG. 1, the gaseous fraction produced by the reaction and/or being a reaction residue migrates through the emulsified mass, passes at $c$ through the chimney perforations, then is removed at $d$ by the upper cap 2'. A part of the emulsion at $e$ is collected in the distributor which gives this fraction a descending rotating motion $f$ within the chimney in which a separation of liquid $g$ and gas $h$ phases is made by centrifugation. The gaseous phase $h$ escapes to the top of the chimney. Liquid phase $g$ is collected, at the bottom, by the inverted cone 11, restrained by the vertical plates, removed at the base, and then introduced again, one part, within the emulsified mass by means of an ascending current, and the other part $i$ flowing through the perforations of the quieting device, towards the reactor bottom from which it is drawn off. The feeding of liquid and gaseous fluids and the drawing off of reaction liquid are such that the emulsion volume remains practically constant and the level of the emulsion varies only between very small limits. Fluid movement inside the reactor remains the same when the emulsion is replaced by a suspension or when the introduced gas is inert. Temperatures and pressures may vary between large limits according to the type of achieved reaction.

In the form of the invention shown in FIG. 3, the gas/liquid emulsion formed in the lower part of reactor has a co-current ascending movement along the entire reactor height. The emulsion flows according to m into the double jacket 4", then is collected by distributor 6 which gives this emulsion a descending rotative movement. The gaseous fraction, separated from the liquid fraction by centrifugation, escapes according to h while the liquid fraction flows according to g to the foot of the chimney.

The explanations given hereinabove, relating to apparatus according to the invention, have been limited, for more clearness, to the case of only one reactor able to run either in a continuous or in a discontinuous manner. It is quite obvious, however, that, according to the type of achieved reaction, and to contemplated production rate, it is possible to associate several reactors of the precited type, as for example two, three or more, disposed in series or in parallel on the same level or in cascades, in an installation comprising annex devices of classical type, such as especially, pumps, thermal exchangers, filters, condensers, distillation columns, extraction batteries, etc.

The dimensions of the reactors, the same as the dimension of the various internal devices, may vary between large limits and are not critical factors. However it appears that especially interesting results may be obtained in numerous gas/liquid or gas/liquid/solid reactions in adopting, for the reactor, a diameter of approximately between one-third and one-fifth of its height, while the internal chimney has a section which may be between one-fifth and one-third of that of the reactor, while the liquid feeding tubes may occupy about one-third to two-thirds of the main body height, while baffles are preferably placed in the upper half of the main jacket and finally while the free space existing between the quieting device base and the reactor bottom may vary between one-fiftieth and one-tenth of the height of the latter.

The materials used for the main jacket and of its internal devices must be chosen by taking into account the various types of reaction, the adopted run conditions (temperature, pressure . . . ). Practically it is generally recommended to use corrosion resisting materials, such as for example: chromium steel, stainless steels, enameled steel, steel lined with plastic materials or noble metal, etc.

The apparatus according to the invention may be used with any type of reaction using one gas or several in the presence of a liquid phase, which may contain solids in suspension, as for example catalysts or activators in pulverulent form. In the field of chemical reactions, it is possible for example to quote: halogenations, oxidations, hydrogenations, dehydrogenations, aminations, sulfonations, etc.

EXAMPLE

Figure 1:
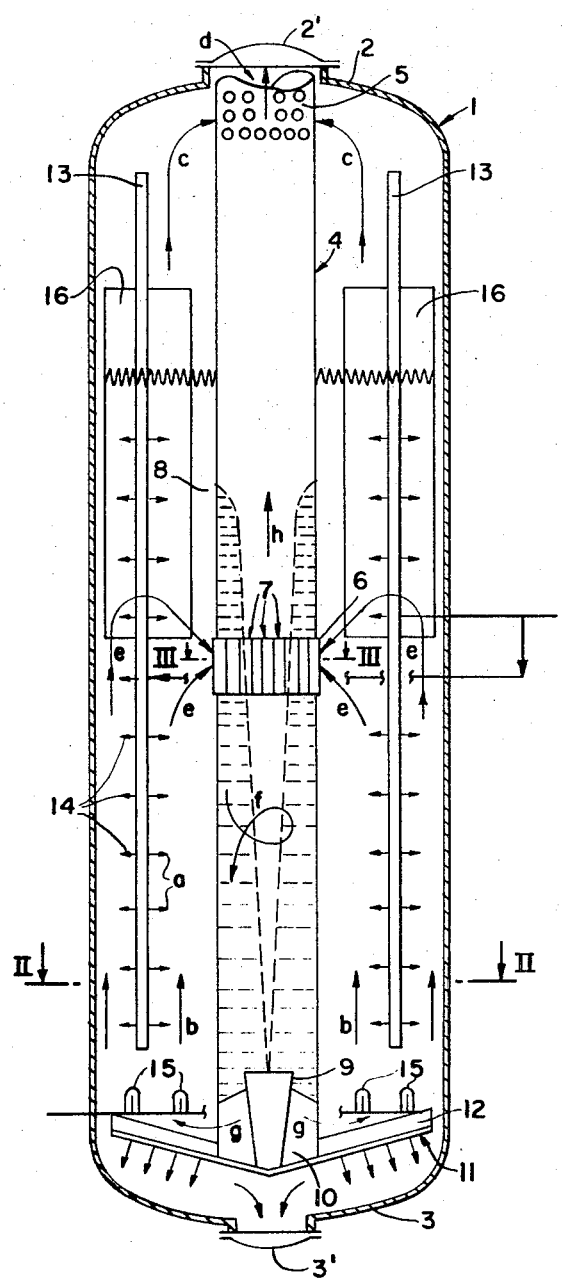
FIG. 1 is a diagrammatic view of a vertical section showing the whole of the characteristic elements of the reactor according to the invention.
Figure 2:
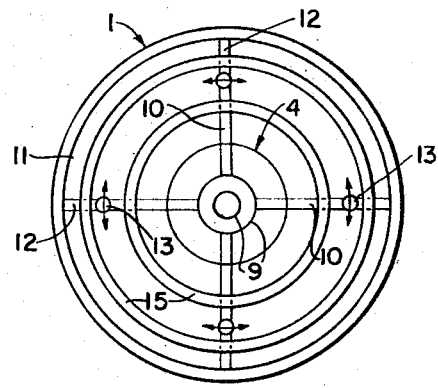
FIG. 2 is a plan view of the lower part of the reactor taken along the line II—II of FIG. 1.

The continuous oxidation by air of an hydrocarbon in liquid phase was conducted for a period of 300 hours, in a reactor of the type shown in FIG. 1, which had a diameter of 3,000 millimeters with a height of about 9,000 millimeters. The internal chimney had an approximate diameter of 900 millimeters and the distributor was placed in the upper third part of the chimney.

The reactor was operated at a temperature of 160° C. under an absolute pressure of 5 bars, the surface speed of gaseous flux, calculated for annular space delimited by chimney and reactor walls, being about 40 centimeters per second.

Gaseous content of liquid/gas emulsion did not exceed 40 percent, the emulsion filling practically the whole of the reactor.

Cooling was accomplished by drawing off about 300 m³/h of the degassed reaction mixture by passage of this liquid into an exchanger, then recycling per 13 into the reaction mass.

During operation it was noted that the temperature gradient within the reactor did not exceed 2° C. Moreover, the gas/liquid emulsion level remained stable during all oxidation time. Further, there was neither valuable carrying away of liquid in the effluent vapor phase, nor fouling of the injection devices. Finally, the wholly degassed liquid phase which was taken off at the foot of the reactor allowed a very regular running of a circulation pump of a very classical type.

It will be obvious to those skilled in the art that various changes may be made without departing from the scope of the invention and the invention is not to be considered limited to what is shown in the drawings and described in the specification.

What is claimed is:

1. Apparatus for reactions between gaseous and liquid phases which may also contain a solid in suspension comprising a cylindrical jacket, a coaxial tube forming a chimney within said jacket, the upper portion of said tube extending approximately to the top of said jacket and the lower part of said tube being separated from the reactor bottom by a free zone, an inverted hollow truncated cone at the lower end of said tube along the axis thereof having a perforated lower surface, a plurality of radial vertical plates attached at their inner ends to said cone and at their outer upper ends to the lowermost portion of said tube, a perforated basin in the shape of an inverted cone attached to said vertical plates, radial baffle plates attached to the upper portion of said basin, a distributor located at an intermediate height of said tube adapted to direct liquid from outside said tube into said tube in a downward tangential direction, baffles located outside said tube in the upper portion of said jacket, and means for adding and drawing off fluids situated in the upper and lower ends of said jacket.

2. Apparatus according to claim 1, wherein the diameter of said tube is uniform along its height and said distributor is located between the lower quarter and the upper quarter of said tube.

3. Apparatus according to claim 1, wherein the upper part of said tube has a reduced diameter, and a coaxial jacket having a conical base surrounding said tube open upwardly and the conical base of which is tightly attached to said tube, said distributor being located in the zone surrounded by said jacket.

4. Apparatus according to claim 1, wherein a plurality of perforated vertical liquid feeding tubes are located between said tube and said jacket distributed about the periphery thereof.

5. Apparatus according to claim 1, wherein said jacket has a diameter approximately between one-third and one-fifth of its height, said tube has a section between one-fifth and one-third that of said jacket, said liquid feeding tubes corresponding to about one-third to two-thirds of the height of said jacket, and the free space existing between the base of the basin and the reactor bottom may vary between one-fiftieth and one-tenth of the height of said jacket.

* * * * *